United States Patent [19]

Sharp

[11] 3,717,774

[45] Feb. 20, 1973

[54] TRANSISTOR AMPLIFIER AND LIMITER CIRCUITS

[75] Inventor: Denis Sharp, East Grinstead, England

[73] Assignee: U.S. Philips Corporation, New York, N.Y.

[22] Filed: July 27, 1970

[21] Appl. No.: 58,348

[30] Foreign Application Priority Data

July 25, 1969 Great Britain.....................37,577/69

[52] U.S. Cl.....................................307/237, 328/168

[51] Int. Cl................................................H03k 5/08

[58] Field of Search ...............307/237, 293; 328/168

[56] References Cited

UNITED STATES PATENTS

| | | | |
|---|---|---|---|
| 3,534,281 | 10/1970 | Hillhouse | 307/237 |
| 3,496,383 | 2/1970 | Tomsa | 307/237 |
| 3,134,033 | 5/1964 | Cepuch et al. | 307/237 |
| 3,500,067 | 5/1970 | Davis et al. | 307/237 |
| 3,233,124 | 2/1966 | Favin | 307/293 |
| 3,307,048 | 2/1967 | Todd | 307/237 |
| 3,215,851 | 11/1965 | Warnock | 307/237 |
| 3,564,437 | 2/1971 | Nakashima | 307/237 |
| 3,092,729 | 6/1963 | Cray | 307/237 |

FOREIGN PATENTS OR APPLICATIONS

| | | | |
|---|---|---|---|
| 247,427 | 10/1962 | Australia | 307/237 |
| 1,119,344 | 12/1961 | Germany | 307/237 |
| 215,148 | 11/1957 | Australia | 307/237 |
| 643,699 | 10/1958 | Canada | |

*Primary Examiner*—Stanley D. Miller, Jr.
*Assistant Examiner*—R. E. Hart
*Attorney*—Frank R. Trifari

[57] ABSTRACT

A transistor amplifier-limiter circuit that includes a transistor in a common emitter configuration with its base connected to receive an AC input signal via a capacitor. In order to maintain the transistor at the threshold of conduction with a constant DC base bias, a unidirectional constant voltage element, e.g. a diode, is provided in a feedback connection between the collector and base of the transistor and poled to conduct from said collector to base. The unidirectional element varies the current flowing in the feedback connection as a function of the instantaneous amplitude of an AC input signal which tends to turn off the transistor.

18 Claims, 11 Drawing Figures

INVENTOR.

BY DENIS SHARP

AGENT

INVENTOR
BY DENIS SHARP
Frank R. Trifari
AGENT

INVENTOR
BY DENIS SHARP
AGENT

INVENTOR
DENIS SHARP
BY
AGENT

TRANSISTOR AMPLIFIER AND LIMITER CIRCUITS

This invention relates to transistor amplifier and limiter circuits suitable for producing a square wave output of substantially constant amplitude in response to an alternating or pulse input having a varying amplitude.

A previous transistor amplifier and limiter circuit comprises a transistor in a common-emitter connection with its base connected to an input terminal via a capacitor and its collector connected via a load resistor to a supply terminal. A d.c. bias point for the transistor is established by means of a resistor connected between the collector and base of the transistor, the transistor being biased at the threshold of conduction. An alternating or pulse input applied to the transistor base drives the transistor into saturation during one half cycle of each cycle of the input to produce a square-wave output at the collector of the transistor. A diode can be connected between the base and emitter of the transistor to prevent the d.c. bias at the base of the transistor from shifting excessively due to the rectification of the alternating or pulse input, as applied to the transistor base, by the base/emitter diode of the transistor.

A drawback of this previous transistor amplifier and limiter circuit is that the d.c. bias at the base of the transistor can still be shifted from its established value by a high amplitude alternating or pulse input to such an extend that, if the amplitude suddenly decreases, albeit to a value to which the circuit would normally respond, no square wave output will be produced by the circuit as a result of the decreased amplitude input until the d.c. bias shifts back to its established value.

It is an object of the present invention to provide a transistor amplifier and limiter circuit which avoids this drawback.

According to the present invention there is provided a transistor amplifier and limiter circuit comprising a transistor in a common-emitter connection with its base connected to receive an alternating or pulse input via a capacitor and its collector connected via a load resistor to a supply terminal: The circuit also includes unidirectional constant voltage means provided in a feedback connection between the collector and the base of the transistor, said means being effective to vary the amount of current flowing in said feedback connection in dependence on the instantaneous amplitude of an applied alternating or pulse input, which tends to turn off said transistor, whereby to maintain at the transistor base, in the presence of such instantaneous amplitude of an applied alternating or pulse input, a d.c. bias of substantially constant value for maintaining said transistor at the threshold of conduction.

In carrying out the invention said unidirectional constant voltage means can be a diode which is poled so as to conduct current from the collector to the base of the transistor. In order to accomodate larger amplitude inputs, a resistor can be connected in series with said diode. Alternatively, said unidirectional constant voltage means can be the base/emitter diode of a second transistor having its base connected to the collector, and its emitter connected to the base of the amplifier and limiter transistor, and its collector arranged for connection to the supply terminal.

As will be described, a transistor amplifier and limiter circuit according to the invention is very sensitive and will produce a square-wave output in response to a polarity change of very low value in an applied alternating or pulse input signal. In certain applications this may make the circuit vulnerable to low amplitude noise signals received with an applied input signal, in that the circuit may be responsive to such noise signals to produce a spurious square-wave output.

To avoid this problem the circuit may be arranged to remain unresponsive to an applied alternating or pulse input of less than a minimum value by including therein a further transistor having its base connected to receive the square-wave output from the collector of the amplifier and limiter transistor, together with a second feedback connection between the collector of said further transistor and the base of the amplifier and limiter transistor, and a resistor connected in series with said capacitor in the base circuit of the amplifier and limiter transistor. The arrangement will then operate so that when said amplifier and limiter transistor is non-conductive, said further transistor is conductive and a potential derived from its collector established in the base circuit of said amplifier and limiter transistor a first potential difference which the amplitude of one polarity of an applied input must exceed before the amplifier and limiter transistor is rendered conductive, whereas when said amplifier and limiter transistor is conductive, said further transistor is non-conductive and a potential derived from its collector establishes in the base circuit of said amplifier and limiter transistor a second potential difference which the amplitude of the other polarity of an applied input must exceed before the amplifier and limiter transistor is rendered non-conductive.

Input amplitude limiting diodes may also be connected across the input of the circuit.

A transistor amplifier and limiter circuit according to the invention is especially useful in anti-lock brake systems for wheeled vehicles, that is, brake systems including means for improving braking performance of a vehicle by relieving braking pressure applied to a road wheel of the vehicle if the wheel tends to lock on a slippery surface following brake application and then increasing the braking pressure again without the need for any change in the actual braking action by a person using the brake. Such systems can be successful in reducing the risk of skidding due to wheel lock and in maintaining directional control during braking, and can also reduce braking distances.

This application of the circuit is in control circuit means of an anti-lock vehicle brake system of the character comprising, for use in conjunction with a vehicle wheel and associated wheel brake, a wheel movement sensor for producing electrical signals related to rotational movement of the wheel, control circuit means which is responsive to said electrical signals to produce an electrical output in dependence on a particular criterion related to wheel rotational movement, and control valve means which is arranged for actuation in response to said electrical output to cause braking pressure as applied from a fluid pressure source of the system to the wheel brake to be relieved. A suitable criterion—though not the only one—is when deceleration of the wheel is in excess of a predetermined value.

In this application, the circuit is used to provide, for processing in the control circuit means, a square wave output of substantially constant amplitude in response to a pulse train (constituting said electrical signals) which is generated in response to wheel rotational movement by, for example, magnetic interaction between a ferromagnetic toothed ring movable with the wheel and an electromagnetic pick-up which is positioned adjacent to the ring to sense the change of flux as each tooth of the ring passes it and is succeeded by a gap when the wheel revolves, said ring and pick-up constituting the wheel movement sensor. The circuit is particularly advantageous in this application because it can maintain its square-wave output of substantially constant amplitude in response to the pulse train from the electromagnetic pick-up even through the pulse amplitude of the pulse train may vary between wide limits due to variation in wheel speed, and due to any misalignment between the center of the ring and its actual axis of rotation.

The present invention also provides an anti-lock vehicle brake system of the above character having control circuit means embodying a transistor amplifier and limiter circuit as set forth above.

In order that the invention may be more fully understood reference will now be made by way of example, to the accompanying drawings in which:

FIG. 5 is a block diagram of a control circuit means of an anti-lock vehicle brake system of the character referred to;

FIG. 7 is a block diagram of an anti-lock vehicle brake system of the character referred to.

Figure 1:
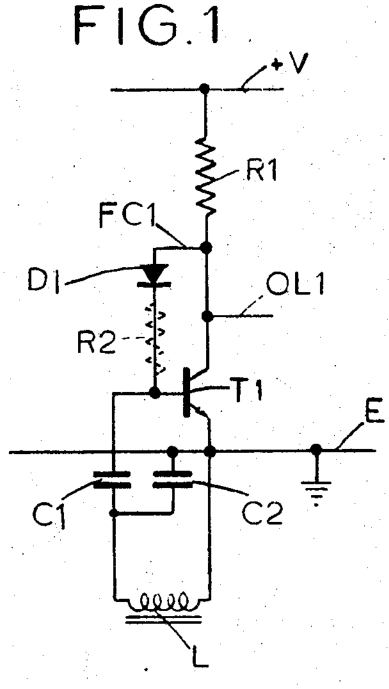
FIGS. 1 and 2 show respective embodiments of a transistor amplifier and limiter circuit conforming to the invention.

Referring to the drawings, the transistor amplifier and limiter circuit shown in FIG. 1 comprises a transistor T1 having its base connected via a capacitor C1 to one end of an output coil L of a pick-up device (not otherwise shown) which is arranged to produce an alternating input signal for application to the base of transistor T1. The other end of the coil L is connected to a ground line E. The collector of the transistor T1 is connected to a positive voltage line +V via a collector resistor R1, and its emitter is connected directly to the ground line E. An output lead OL1 is taken from the collector of the transistor T1. A capacitor C2 serves to remove unwanted interference in the alternating input signal from the coil L.

In accordance with the invention, a feedback connection FC1 is provided between the collector and the base of the transistor T1. This feedback connection includes a diode D1 which is poled so as to conduct current from the collector to the base. As indicated in dotted lines, a resistor R2 may also be included in the feedback connection FC1 in series with the diode D1. When the circuit is energized by the application of a suitable supply voltage across the positive voltage line +V and the ground line E, the transistor T1 is initially biased at the threshold of conduction by a bias voltage (+*b*) which is present at its base, this bias voltage (+*b*) being the voltage drop across the feedback connection FC1 due to current flow therethrough from collector to base. Upon the application of an alternating input signal from the coil L to the base of transistor T1, this transistor is rendered conductive in response to each positive going part of the input to effect amplification and limiting at the input signal frequency, and the resulting output at the output lead OL1 is a square-wave voltage. More specifically, an applied alternating input signal may be as shown in the wave form diagram of FIG. 8. This alternating input signal has a normal amplitude (+A,–A) sufficient to saturate the transistor T1, but also having a possible excess amplitude (+A′, –A′). With the transistor T1 at the threshold of conduction, this transistor is saturated each time the rate of change of signal current through capacitor C1 drives sufficient current into the transistor base, that is, at points P1 on the waveform diagram 8*a*. Conversely, the transistor T1, when saturated, is turned off each time the rate of change of signal current through capacitor C1 drives insufficient current into the transistor base to maintain the saturated condition, that is, at points P2 on the waveform diagram 8*a*. This circuit operation is made possible, irrespective of large variations in the amplitude of the alternating input signal, because the bias voltage (+*b*) at the base of transistor T1 remains substantially unchanged due to the action of the feedback connection FC1. The diode D1 (and the resistor R2 when provided) in the feed-back connection FC1 provide(s) a voltage drop between the collector and the base of the transistor T1. As aforesaid, this voltage drop, which can be of the same magnitude as the base-emitter voltage of the transistor T1, provides the bias voltage (+*b*) at the transistor base. Each negative half-cycle of the alternating input signal draws increased current, in relation to its amplitude, through the feedback connection FC1 and, but for the presence of the diode D1, this increased current would produce at the base of transistor T1 a change in the bias voltage in a sense taking the transistor hard into cut-off to an extent determined by the magnitude of the change. The diode D1 prevents this from happening by functioning as a constant voltage device to maintain the bias voltage substantially unchanged at the base of the transistor T1. The square-wave output produced at the output lead OL1 of the circuit is represented by the waveform diagram of FIG. 8. This square-wave output has a square-wave pulse for each cycle of the alternating input signal regardless of the change in amplitude of the latter. The amplitude swing of the square-wave output is between a voltage +*v*, which is just above ground potential (e.g., 100 millivolts) due to maximum current through transistor T1 when the latter is saturated, and a higher voltage 130 *v*′ which equals the voltage drop across the feed-back connection FC1 plus the voltage drop across the base/emitter diode of transistor T1 when the latter is held at the threshold of conduction.

Figures 8A, 8B, 8C, 8D:
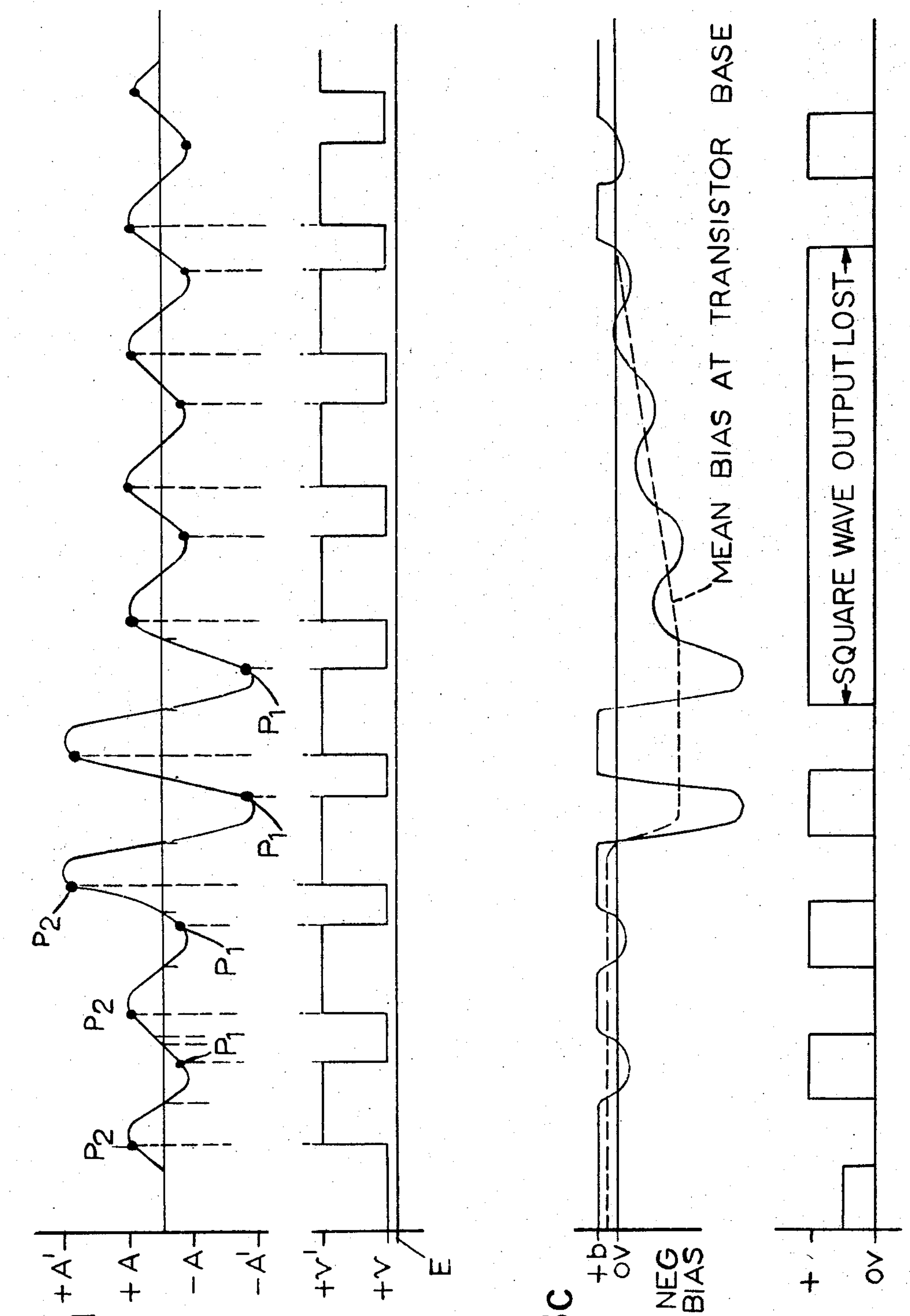
FIGS. 8*a*–8*d* show explanatory waveform diagrams.

It is of interest to compare this square-wave output with the square-wave output represented by the waveform diagram of FIG. 8*d*, which is assumed to be the output from the previous transistor amplifier and limiter circuit, referred to at the beginning of the specification, in response to the alternating input signal represented by the waveform diagram 8*a*. In this previous transistor amplifier and limiter circuit, the bias voltage at the transistor base is provided by means of a resistance connected between the collector and base of the transistor, and not by a feed-back connection including a constant voltage device as in the present invention. As a consequence, the bias voltage is susceptible to change depending on the amplitude of the alternating input signal, and the waveform diagram of FIG. 8*c* shows the change in the bias voltage. It can be seen from waveform diagram 8*c* that large amplitude cycles of the alternating input signal can reduce the bias voltage (+*b*) to such an extend that, for a number of small amplitude cycles immediately following the large amplitude cycles, the bias voltage (+*b*) remains below the threshold value. Therefore, the transistor remains unresponsive to those small amplitude cycles until the bias voltage (+*b*) is restored to the threshold value and it produces no square-wave output in respect of them. The square-wave output produced in this case is represented by the waveform diagram 8d. Each pulse, when produced, of this output is due to switching of the transistor between conductive and non-conductive states in successive half-cycles of the alternating input signal.

Figure 2:
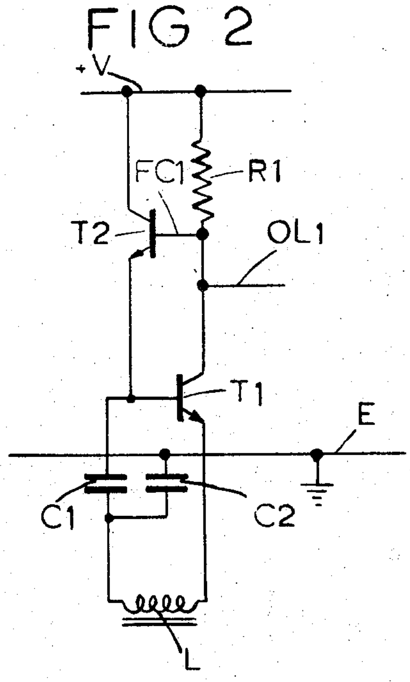

The transistor amplifier and limiter circuit shown in FIG. 2 is similar in many respects to the circuit of FIG. 1 and, for the sake of convenience, corresponding components in these two circuits have been given the same references. In the circuit of FIG. 2, the feedback connection FC1 is provided by a transistor T2 which has its base connected to the collector, and its emitter connected to the base, of the transistor T1. The base/emitter diode of the transistor T2 forms the constant voltage device for the feed-back connection FC1, and the circuit operation by which the bias voltage (+*b*) at the base of transistor T1 is maintained substantially unchanged is the same as that already described for FIG. 1, the voltage drop across the base/emitter diode of the transistor T2 remaining substantially constant despite increased conduction of this transistor due to each negative half-cycle of the alternating input signal.

Because each of the circuits of FIGS. 1 and 2 are responsive to the rate of change of signal current through capacitor C1, they are extremely sensitive to small amplitude inputs. Therefore, as aforesaid, this may make these circuits vulnerable to low amplitude noise signals received with an applied input, in that the circuits may be responsive to such noise signals to produce a spurious square-wave output. This is avoided in the circuits of FIGS. 3 and 4 which are arranged to remain unresponsive to an alternating input signal of less than a predetermined minimum magnitude.

Figure 3:
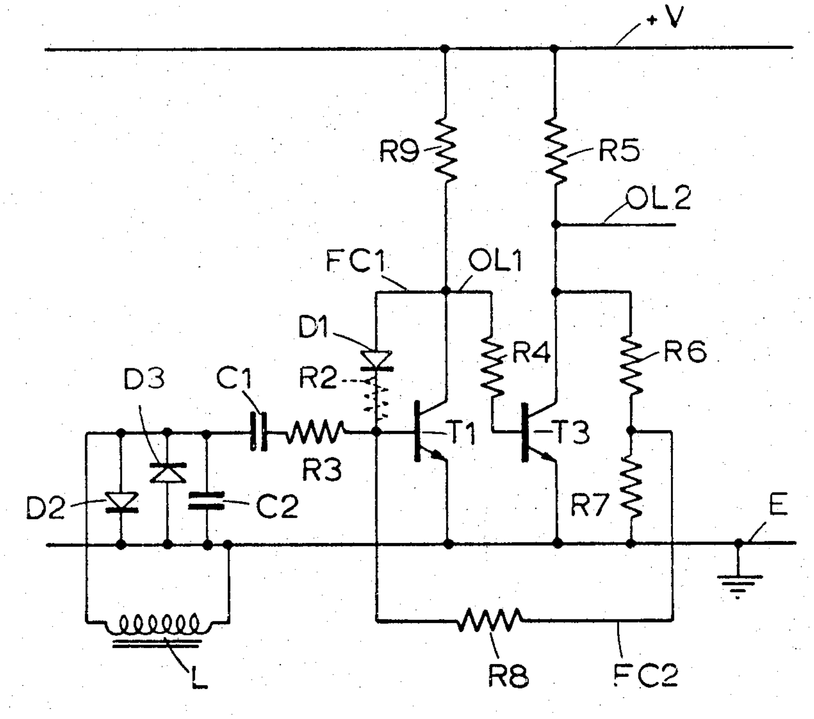
FIGS. 3 and 4 show modifications of the circuits of FIGS. 1 and 2, respectively.

The circuit of FIG. 3 comprises components T1, D1, C1, C2 (R2 when provided) and L which correspond to the similarly referenced components in the circuit of FIG. 1. Additionally, in the circuit of FIG. 3, the base circuit of the transistor T1 includes input amplitude limiting diodes D2 and D3, and a resistor R3 which is connected in series with the input capacitor C1. Also, in the circuit of FIG. 3, the square-wave output produced at the output lead OL1 is fed via a resistor R4 into the base of a further transistor T3 which has its emitter connected to the ground line E and its collector connected via a resistor R5 to the positive voltage line +V. Two resistors R6 and R7 are connected in series between the collector of transistor T3 and the ground line E and a second feedback connection FC2, including a resistor R8, is taken from the junction of the resistors R6 and R7 to the base of the transistor T1. An output lead OL2 is taken from the collector of transistor T3.

Considering now the operation of the circuit of FIG. 3, and assuming, first of all, that transistor T1 is non-conductive, that is, this transistor is biased at the threshold of conduction by the feed-back connection FC1. With transistor T1 non-conductive, the transistor T3 is in saturation so that the junction of the resistors R6 and R7 is effectively at the potential of the ground line E. Thus the base of the transistor T1 can be considered as being connected to the ground line E through the resistor R8. The ratio of the values of the resistors R3 and R8 determines the minimum magnitude of an alternating input signal which must be present before the transistor T1 is rendered conductive. This ratio may be, for example, 1:10, in which case an input signal of one tenth the base/emitter voltage (V*be*) of transistor T1 must be present before the transistor T1 becomes conductive. When the transistor T1 is in saturation, the transistor T3 is cut-off so that the junction of the resistors R6 and R7 is at a potential above that of the ground line E, being a proportion of the collector potential of transistor T3 in dependence on the relative values of the resistors R6 and R7. Thus the base of the transistor T1 is now effectively connected to this potential which is arranged to be as much greater than the bias voltage (+*b*) as this bias voltage is greater than the potential of the ground line E. Consequently, due to the ratio of the values of the resistors R3 and R8, an input signal (in opposite sense to previously) of, say, one tenth the base/emitter voltage (V*be*) of transistor T1 (as aforesaid) must be present before the transistor T1 is cut off. A square-wave output is produced by the circuit at the output lead OL2.

Figure 4:
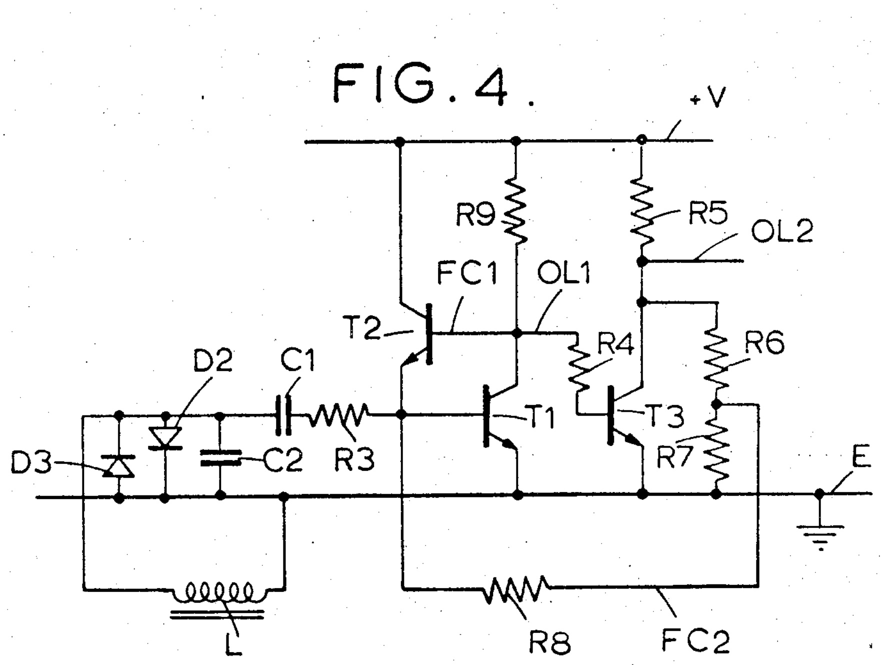

The circuit of FIG. 4 is the same as the circuit of FIG. 3 except that its feed-back connection FC1 includes the transistor T2 instead of the diode D1.

Suitable types and values for the compounds of the circuits of FIGS. 1 to 4 are as follows:

| | |
|---|---|
| Transistor T1—Mullard BC 109 | Diode D1—Mullard OA 202 |
| Transistor T2—Mullard BC 109 | Diode D2—Mullard OA 202 |
| Transistor T3—Mullard BC 109 | Diode D3—Mullard OA 202 |

| | | |
|---|---|---|
| Resistor R1 — | 18 K ohms | Capacitor C1 — 0.22 μF |
| Resistor R2 — | 100 K ohms | Capacitor C2 — 0.1 μF |
| Resistor R3 — | 22 K ohms | Voltage +V — 8.2 volts (stabilized) |
| Resistor R4 — | 10 K ohms | |
| Resistor R5 — | 4.7 K ohms | |
| Resistor R6 — | 68 K ohms | |
| Resistor R7 — | 12 K ohms | |
| Resistor R8 — | 220 K ohms | |
| Resistor R9 — | 47 K ohms | |

As aforesaid, an amplifier and limiter circuit according to the invention has application in the control circuit means of an anti-lock vehicle brake system of the character referred to, and an example of this application will now be considered.

Figure 5:
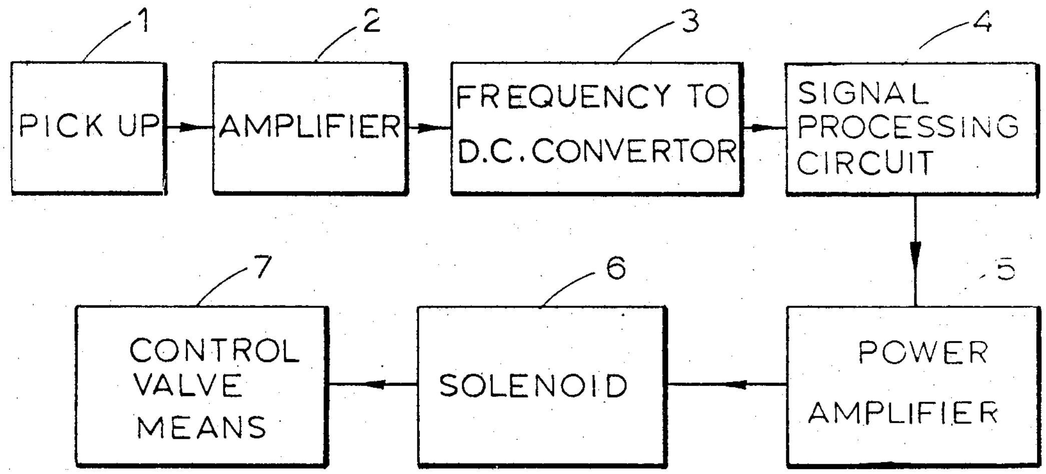

Turning now to FIG. 5, the control circuit utilized represented by the block diagram there shown is responsive to pulses related to rotational movement of a vehicle wheel. These pulses may be produced by an electromagnetic picklup 1 which, as aforesaid, is associated with a ferromagnetic toothed ring movable with the wheel to sense change of flux as each tooth of the ring passes it and is succeeded by a gap as the wheel revolves. The pulse output from the pick-up 1 is amplified and limited by an amplifier circuit 2 which would be comprised by a transistor amplifier and limiter circuit conforming to the invention. The resulting square-wave output is applied to a frequency-to-DC convertor 3 which is responsive thereto to produce an output voltage of a magnitude related to the frequency of the pulses supplied by the pick-up 1. This output voltage is applied to a signal processing circuit 4 which is responsive to produce an output in dependence on a particular criterion related to wheel rotational movement as signified by the output voltage from the convertor 3. The output from the circuit 4 is amplified by a power amplifier 5, and the output from the power amplifier 5 is utilised to operate a solenoid 6 which is adapted to actuate control valve means 7 of an anti-lock vehicle brake system.

In the circuit diagram of the control circuit means shown in FIG. 6, the pick-up is again represented only by its output coil L as in FIGS. 1 to 4. The pulse output from this pick-up output coil L is coupled into the base of a transistor T*a* via a capacitor C*a*. This transistor T*a* with its associated components comprises the amplifier 2 in FIG. 5 and forms a transistor amplifier and limiter circuit in accordance with the invention. The biasing for the transistor T*a* can be provided by means of a diode D*f*, (with or without a resistor R*a* in series therewith) in a feed-back connection between the collector an base of the transistor, as already described with reference to FIG. 1. Alternatively, the biasing for the transistor Ta can be provided by means of a further transistor T*h* (shown in dotted lines), connected as shown, as already described with reference to FIG. 2. As further alternatives, the transistor Ta may be included in an amplifier and limiter circuit as already described with reference to FIG. 3 and FIG. 4. A capacitor C*b* serves to remove unwanted interference in the output from the output coil L.

The output produced at the collector of transistor T*a* is a square-wave voltage which is coupled into the base of a transistor T*b* via a capacitor C*c*. The value of capacitor C*c* and a base resistor R*b* for transistor T*b* are so chosen that the transistor T*b*, which is normally conductive, is rendered non-conductive to produce a positive pulse of fixed length at its collector for each cycle of square-wave voltage coupled into its base. Each such positive pulse charges up a capacitor C*d* through a diode D*b* to the stabilized voltage on the line SL. The stabilized voltage is provided by a Zener diode Z*d* which is connected in series with a resistor Rc across the voltage supply lines +V and OV. At the termination of each positive pulse at the collector of transistor T*b*, capacitor C*d* commences to discharge exponentially through a resistor R*d* and transistor T*b*. When the voltage across the capacitor C*d* becomes negative with respect to the voltage across a capacitor C*e*, a diode Dc becomes forward biassed so that capacitor C*e* also commences to discharge through the diode D*c*, but at a much lower rate because its discharge time constant is much longer than the discharge time constant of capacitor Cd. However, each time capacitor C*d* is being re-charged, diode D*c* is back biased, thus allowing capacitor C*e* to charge up via a resistor R*e* with which it is connected in series across the voltage supply lines +V and OV. The components T*b*, D*b*, R*d*, DC, C*d*, C*e* and R*e* essentially comprise the frequency-to-DC convertor 3 of FIG. 5, and this convertor produces across capacitor C*e* an output voltage whose value is related to the input frequency of the pulse output supplied by the pick-up, and may thus be termed a speed signal as it is directly related to wheel speed. This output voltage (speed signal) across capacitor C*e* is coupled to the base of a normally conductive transistor T*c* via a capacitor C*f* and a resistor R*f*. The value of this capacitor C*f* and the value of a resistor R*g*, to which the capacitor is also coupled, determine a value of wheel deceleration at which transistor T*c* and a further normally conductive transistor Td are rendered non-conductive in response to the value of speed signal then prevalent, to cause a normally non-conductive transistor T*e* to become conductive. The components C*f*, C*g*, T*c*, T*d*, R*f*, R*g*, R*h* and D*d* comprise the signal processing circuit 4 of FIG. 5. The resistor R*g*, which together with resistor R*f* forms a potential divider in the base circuit of transistor T*c*, provides a current sufficient to drive the base of transistor T*c* with about 10 times the current needed to maintain the two transistors T*c* and T*d* conductive. Thus the selected wheel deceleration at which transistor T*e* becomes conductive is virtually independent of the gains of the transistors T*c* and T*d*. A resistor Rh in the collector circuit of transistor T*c* serves to limit the base current of transistor T*d*. A capacitor C*g* and the resistor R*f* in the base circuit of transistor T*c* makes the circuit insensitive to ripple in the speed signal. A diode D*d* serves to stabilize the base current of the transistor T*c* against temperature changes. A capacitor C*h* serves to prevent spurious oscillation at high frequencies due to the transistors being capable of working up to 80 M/cs.

The transistor T*f* and a further transistor T*g* amplify the output from transistor T*e*. The transistors *Te*, T*f* and T*g* form the power amplifier 5 of FIG. 5. The output from transistor T*g* drives a solenoid S which corresponds to the solenoid 6 in FIG. 5. A diode De serves to clip the overshoot voltage on the solenoid S when it is switched off, thereby preventing too high a voltage from being applied to the collector of transistor T*g*.

The circuit parameters are chosen so that the solenoid will be turned off when the wheel being sensed has accelerated up to the speed it would have been doing if it had continued to decelerate from its initial speed, at the instant of braking, at a rate equal to the selected wheel deceleration at which the solenoid was turned on.

It is also arranged that the solenoid S is turned off after a predetermined period, even if the wheel does not re-accelerate after the solenoid S has been turned on. This is achieved by means of capacitor C*f* which, in conjunction with resistor R*g*, serves as an a.c. coupling to differentiate the speed signal so that, after a certain period of energization of the solenoid, as determined by the time constant of this a.c. coupling, the transistors T*c* and T*d* are rendered conductive again to render transistor T*g* non-conductive to de-energize the solenoid. However, since the capacitor C*f* and resistor Rg also determine the selected value of wheel deceleration, the time constant of the a.c. coupling afforded by these components cannot be varied to vary the period before the solenoid is de-energized in the absence of wheel re-acceleration, without also varying the selected wheel deceleration. A separate a.c. coupling which is independent of capacitor Cf and resistor Rg suitably comprises a further capacitor connected in the base circuit of transistor Te, together with a further resistor connected between this base and the OV line.

Figure 6:
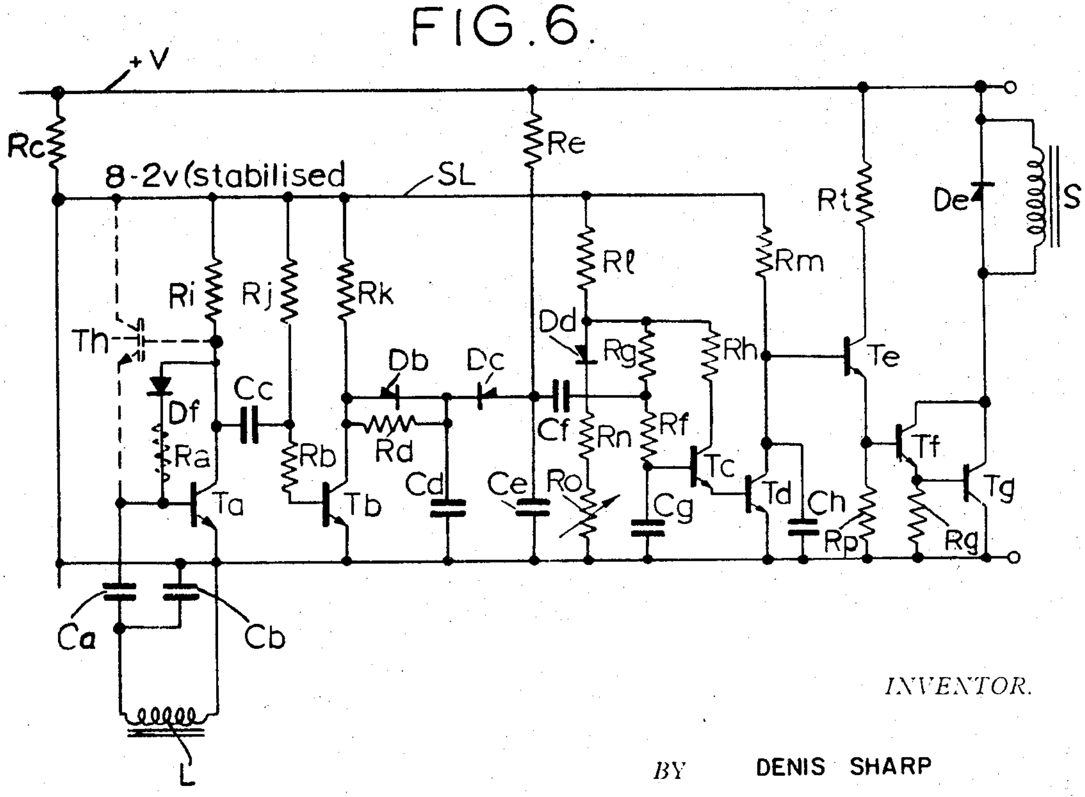
FIG. 6 is a circuit diagram of the control circuit means of FIG. 5.

The circuit diagram of FIG. 6 may be modified in that if a capacitor Cf of larger value and higher gain transistors are used, the transistor Tc and its collector resistor Rh can be dispensed with and the junction of resistor Rf and capacitor Cg can then be connected directly to the base of transistor Td.

In each of the circuits of FIGS. 1 to 4 and FIG. 6, transistors of opposite type to those shown may be used with suitable adjustment of the voltage supply lines.

Suitable components and component values for the circuit diagram of FIG. 6 are as follows for a wheel diameter of 2 feet having 60 teeth/revolution on a toothed ring attached thereto, for which a typical output voltage from the magnetic pick-up would be 1 volt peak at 100 cps (7mph) with a 1mm air gap. Flexing of the pick-up assembly may reduce the output voltage to 200 millivolts due to an increase in the air gap. Typical output voltage at high speed (70mph) may be 10 volts peak at 1,000 cps (approx).

Resistors

| | |
|---|---|
| Ra - 100K ohms | Rj - 56K ohms |
| Rb - 3.3.K ohms | Rk - IK ohms |
| Rc - 150 ohms | Rl - 10K ohms |
| Rd - 15K ohms | Rm - 33K ohms |
| Re - 150K ohms | Rn - 4.7 Kohms |
| Rf - 33K ohms | Ro - 10K ohms |
| Rg - 470K ohms | Rp - 10K ohms |
| Rh - 470K ohms | Rq - IK ohms |
| Ri - 18K ohms | Rr - 150 ohms |

| Capacitors | Transistors |
|---|---|
| Ca - .22 μF | Ta - type BC 108 (Mullard) |
| Cb - 0.1 μF | Tb " " |
| Cc - .022 μF | Tc " " |
| Cd - 0.1 μF | Td " " |
| Ce - 1.0 μF | Te " " |
| Cf - 1.0 μF | Tf - BFY 52 " |
| Cg - 0.1 μF | Tg - BDY10 " |
| Ch - 2kpF | Th - BC 109 " |

| Diodes | Voltages |
|---|---|
| Zd - 8.2v zener (Mullard) | +V = 12 volts |
| Da - type OA202 " | |
| Db - " " | |
| Dc - " " | |
| Dc - " " | |
| Dd - " " | |
| De - BYZ10 " | |
| Df - OA202 " | |

Figure 7:
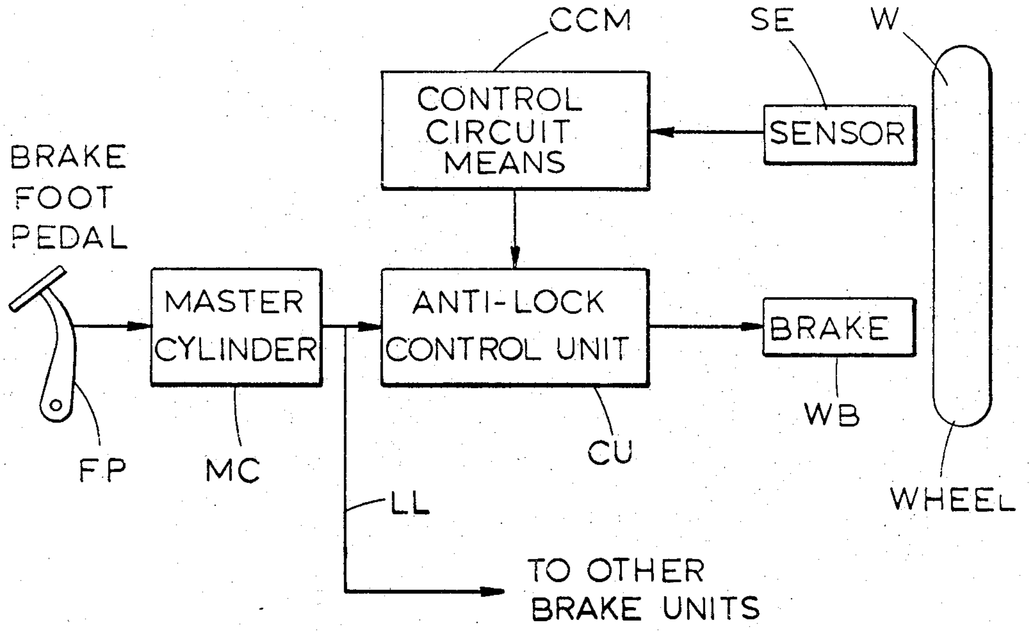

FIG. 7 shows diagrammatically a general layout for an anti-lock vehicle brake system in which the present invention can be embodied. The layout shows a brake foot pedal FP for actuating the piston of a master cylinder MC which constitutes a fluid pressure source of the system. The master cylinder is arranged to actuate (directly or via a servo) a wheel brake WB for a vehicle wheel W via an anti-lock control unit CU. A wheel movement sensor SE applies electrical pulses related to wheel rotational movement to a control circuit means CCM. The anti-lock control unit CU would include valve means which is arranged for actuation in response to an electrical output from the control circuit means CCM to relieve the braking pressure applied to the wheel brake WB. This system is of the character previously referred to, and in the present instance in which the control circuit means is in accordance with FIGS. 5 and 6, the electrical output would be produced from the control circuit means CCM when the deceleration of the wheel is in excess of a predetermined value. The wheel movement sensor SE would be the pick-up 1. The solenoid 6 and the control valve means 7 would be included in the anti-lock control unit CU.

As indicated by the lead LL, separate systems as shown in FIG. 7 (with a common fluid pressure source) may be provided in respect of each road wheel of a vehicle, but it would also be possible to provide a single system for two (rear) wheels driven by a vehicle propellor shaft with a sensor associated with the shaft for producing the electrical signals related to wheel rotational movement. As an alternative, a single anti-lock control unit including control valve means may be provided in common for all the road wheels of a vehicle. In this case each road wheel would have its own wheel movement sensor and associated control circuit means, and any of the latter would provide an electrical output to actuate the control valve means when the appertaining wheel tends towards a locked condition.

As alternatives to the particular form of signal processing circuit shown in FIG. 6, any of the signal processing circuits described in my copending U.S. application Ser. No. 884,551 now abandoned, can be used in control circuit means including an amplifier and limiter circuit according to the present invention. A control circuit means as thus embodied can be for an anti-lock vehicle brake system as described in a copending U.S. application Ser. No. 215,622, filed Jan. 5, 1972, which is a continuation of U.S. application Ser. No. 881,460 filed Dec. 2, 1969.

What we claim is:

1. A transistor amplifier and limiter circuit comprising, a voltage supply terminal, a capacitor, a transistor in a common-emitter connection with its base connected to receive an alternating input signal via said capacitor and its collector connected via a load resistor to said supply terminal, unidirectional constant voltage means provided in a negative feedback connection between the collector and the base of the transistor, said means being effective to vary the amount of current flowing in said feedback connection depending upon the instantaneous amplitude of an applied alternating input signal which tends to turn off said transistor, whereby to maintain at the transistor base, in the presence of such instantaneous amplitude of applied alternating input signal, a d.c. bias of substantially constant value for maintaining said transistor at the threshold of conduction.

2. A transistor amplifier and limiter circuit as claimed in claim 1, wherein said unidirectional constant voltage means comprises a diode which is poled so as to conduct current from the collector to the base of the transistor.

3. A transistor amplifier and limiter circuit as claimed in claim 2 further comprising a resistor connected in series with said diode between the collector and base of the transistor.

4. A transistor amplifier and limiter circuit as claimed in claim 1, wherein said unidirectional constant voltage means comprises the base/emitter diode junction of a second transistor having its base connected to the collector and its emitter connected to the base of the first transistor, and its collector connected to said supply terminal.

5. A transistor amplifier and limiter circuit as claimed in claim 1 including therein a further transistor having its base connected to receive the square-wave output from the collector of the first transistor, a second feed-back connection between the collector of said further transistor and the base of the first transistor, and a resistor connected in series with said capacitor in the base circuit of the first transistor, the arrangement being such that when said first transistor is non-conductive, said further transistor is conductive and a potential derived from its collector establishes in the base circuit of said first transistor a first potential difference which the amplitude of one polarity of an applied input must exceed before the first transistor is rendered conductive, whereas when said first transistor is conductive, said further transistor is non-conductive and a potential derived from its collector establishes in the base circuit of said transistor a second potential difference which the amplitude of the other polarity of an applied input must exceed before the first transistor is rendered non-conductive.

6. A transistor amplifier an limiter circuit as claimed in claim 1 including first and second oppositely poled amplitude limiting diodes connected across the input of the circuit.

7. A transistor amplifier and limiter circuit as claimed in claim 2 comprising a further transistor having its base connected to receive the square wave output signal from the collector of the first transistor, a second feedback connection including a resistor connected between the collector of said further transistor and the base of the first transistor, and a second resistor connected in series with said capacitor in the base circuit of the first transistor, and means for biasing said first and further transistors so that when one is cut-off the other conducts, and vice-versa.

8. A transistor amplifier and limiter circuit as claimed in claim 4 comprising a further transistor having its base connected to receive the square wave output signal from the collector of the first transistor, a second feedback connection including a resistor connected between the collector of said further transistor and the base of the first transistor, and a second resistor connected in series with said capacitor in the base circuit of the first transistor, and means for biasing said first and further transistors so that when one is cut-off the other conducts, and vice-versa.

9. A transistor amplifier comprising, a source of DC supply voltage, a capacitor, a transistor connected in common emitter configuration, means for coupling a time-varying input signal to the base of the transistor via said capacitor, a load resistor connected between the collector of the transistor and one terminal of said supply source, means connecting the emitter of the transistor to the other terminal of the supply source, a negative feedback circuit connected between the collector and base of the transistor including a unidirectional current element polarized in the same direction as the base-emitter rectifying junction of the transistor, and means including said unidirectional element for biasing the transistor at the threshold of conduction in the presence of an input signal which tends to drive the transistor into cut-off.

10. An amplifier as claimed in claim 9 wherein said transistor comprises an NPN device and said unidirectional element comprises a diode with its anode connected to the collector and its cathode connected to the base of the transistor.

11. An amplifier as claimed in claim 9 wherein said unidirectional element comprises a diode polarized to conduct current from the collector to the base of the transistor and the base-emitter rectifying junction of the transistor is polarized to conduct current from the base to the emitter whereby the transistor is normally biassed at the threshold of conduction in the absence of an input signal by means of a current flowing from said one terminal of the supply source through the load resistor and the commonly polarized diode and base-emitter rectifying junction.

12. An amplifier as claimed in claim 9 wherein said unidirectional current element comprises the base-emitter rectifying junction of a second transistor of the same conductivity type as the first transistor and having its base and emitter electrodes connected to the collector and base electrodes, respectively, of the first transistor, and means connecting the collector of the second transistor to said one terminal of the supply source.

13. An amplifier as claimed in claim 9 wherein said input signal comprises an AC signal of a magnitude that alternately drives said transistor into cut-off and saturation and said biasing means is arranged to bias the transistor at the threshold of conduction in the absence of an input signal.

14. An amplifier as claimed in claim 10 wherein said input signal comprises a train of pulses and said biasing means is arranged to forward bias said diode in the absence of an input signal.

15. An amplifier as claimed in claim 12 further comprising a third transistor with its base connected to the collector of the first transistor, a second feedback circuit including a resistor connected between the collector of the third transistor and the base of the first transistor, means connecting the emitter and collector of said third transistor to the terminals of the supply source, and means for biasing said first transistor into cut-off and said third transistor into saturation.

16. An amplifier as claimed in claim 9 wherein said unidirectional element comprises a diode poled to conduct current from the collector to the base of the transistor, said amplifier further comprising, a second transistor with its base connected to the collector of the first transistor, a second feedback circuit including a resistor connected between the collector of the second transistor and the base of the first transistor, means connecting the emitter and collector of said second transistor to the terminals of the supply source and the collector of the second transistor to an output terminal of the amplifier, and means for biasing said first transistor into cut-off and said second transistor into saturation.

17. An amplifier as claimed in claim 16 wherein said first and second transistors comprise semiconductor devices of the same conductivity type.

18. An amplifier as claimed in claim 9 further comprising a second transistor with its base connected to the collector of the first transistor and its emmitter and collector respectively connected to the terminals of the supply source, said biasing means including means for coupling said first and second transistors together so that when one is cut-off the other conducts, and vice-versa, and a second feedback connection connected between the collector of the second transistor and the base of the first transistor and arranged so that the collector voltage of the second transistor establishes a voltage threshold level at the base of the first transistor which the input signal must exceed before it can produce an effect upon the conduction level of the first transistor.

* * * * *